(No Model.)
E. EMMERT.
LIFTING JACK.
No. 292,739. Patented Jan. 29, 1884.
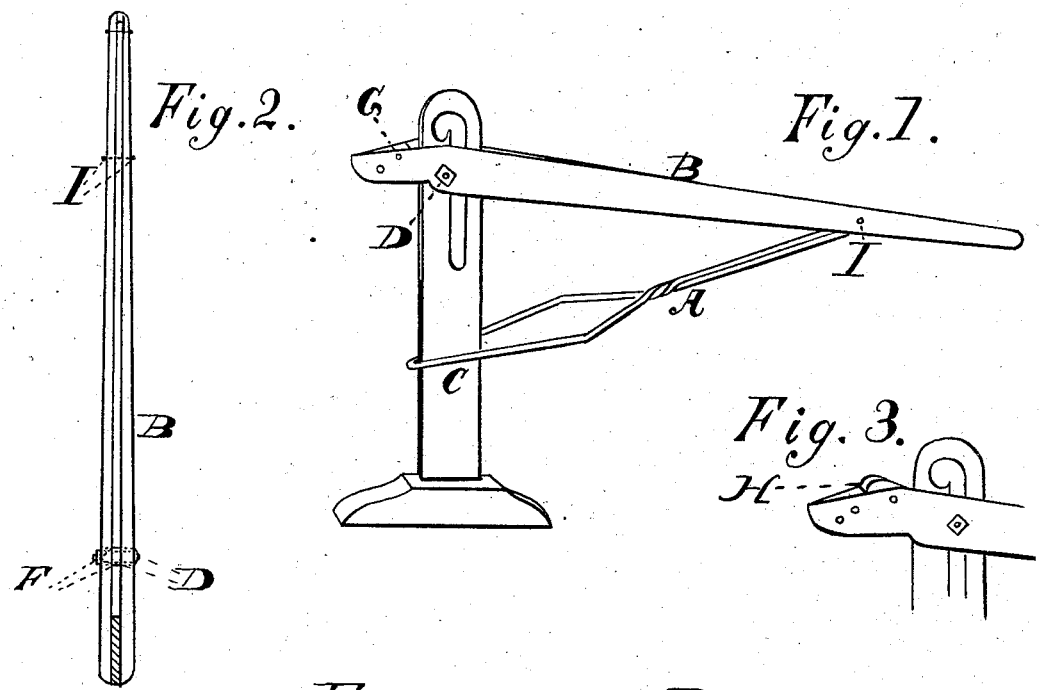
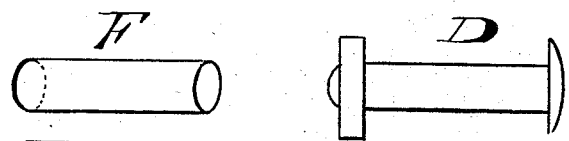
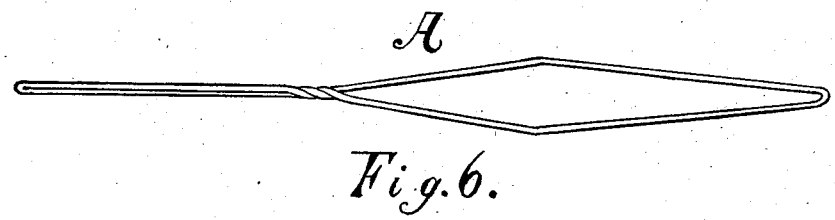
Witnesses:
D. Heaton
E. A. Heaton.
Inventor.
Ezra Emmert

UNITED STATES PATENT OFFICE.

EZRA EMMERT, OF DIXON, ILLINOIS.

LIFTING-JACK.

SPECIFICATION forming part of Letters Patent No. 292,739, dated January 29, 1884.

Application filed October 2, 1882. (No model.)

*To all whom it may concern:*

Be it known that I, EZRA EMMERT, a citizen of the United States, residing at Dixon, in the county of Lee and State of Illinois, have invented certain new and useful Improvements in Wagon and Carriage Jacks, of which the following is a specification, reference being had to the accompanying drawings, in which—

Figure 1 is a side view, and Figs. 2, 3, 4, 5, and 6 sections thereof.

My invention relates to wagon and carriage jacks; and it consists in the construction and arrangement of its several parts, as will be hereinafter set forth and claimed.

E is the base, to which the standard C is attached. The top or upper end of the standard is placed between the bars which form lever B.

Near the top of the standard C is an opening, J, to allow lever B to be moved up or down, so that it can be adjusted to the front or rear axle of a wagon or carriage.

A is a link pivoted at I. A bolt, D, passes through the bars forming lever B, and through a piece of hollow pipe placed between said bars, to keep them apart and prevent them from bearing against standard C.

G is a block placed between the bars of lever B to hold them apart.

Fig. 2 shows a top view of lever B, pivot I, block G, bolt D, and pipe F.

In Fig. 3, H is a piece of iron, oval on top and attached to lever B.

In Figs. 4, 5, and 6, pipe F, bolt D, and link A are shown.

In operation, the end of the lever B is grasped with the right hand, while the left hand is placed under the link A and around lever B, near pivot I.

Pressing with the left hand on the under side of link A will cause it to move up against lever B, when the end of the lever at G can be placed under the axle of a wagon or carriage. Letting go the link A and bearing down with the right hand will cause the link to drop down of its own weight, and it will catch at any point on standard C, which will raise the wheel from the ground and hold it up.

What I claim, and desire to secure by Letters Patent of the United States, is—

1. In a wagon and carriage jack, link A, placed on the under side of lever B, V-shaped at the front end, and so that it will catch at any point on standard C, said link having an extension the end of which is pivoted at or near the handle of lever B, in combination with lever B and standard C, substantially as shown and described.

2. Standard C, lever B, pipe F, bolt D, and opening J, substantially as shown and described.

EZRA EMMERT. [L. S.]

Witnesses:
DAVID D. O'BRIEN,
GEO. D. O'BRIEN.